United States Patent
Berntsson et al.

(10) Patent No.: US 7,845,674 B2
(45) Date of Patent: Dec. 7, 2010

(54) AIR-BAG ARRANGEMENT AND A METHOD OF PREPARING AND MOUNTING AN AIR-BAG

(75) Inventors: Mats Berntsson, Gothenburg (SE);
Hakan Jaconelli, Alingsas (SE);
Fredrik Kjell, Alingsas (SE)

(73) Assignee: Autoliv Development AB, Vargarda (SE)

( * ) Notice: Subject to any disclaimer, the term of this patent is extended or adjusted under 35 U.S.C. 154(b) by 1004 days.

(21) Appl. No.: 10/534,220

(22) PCT Filed: Nov. 4, 2003

(86) PCT No.: PCT/SE03/01693

§ 371 (c)(1),
(2), (4) Date: Jan. 9, 2006

(87) PCT Pub. No.: WO2004/041598

PCT Pub. Date: May 21, 2004

(65) Prior Publication Data

US 2007/0001434 A1    Jan. 4, 2007

(30) Foreign Application Priority Data

Nov. 7, 2002   (GB) .................................. 0226042.0

(51) Int. Cl.
*B60R 21/213*    (2006.01)
*B60R 21/16*    (2006.01)
(52) U.S. Cl. .................................. 280/730.2; 280/743.1
(58) Field of Classification Search .............. 280/730.2, 280/743.1; *B60R 21/213*
See application file for complete search history.

(56) References Cited

U.S. PATENT DOCUMENTS

| | | | |
|---|---|---|---|
| 5,788,270 A | 8/1998 | HÅland et al. |
| 5,984,348 A | 11/1999 | Specht et al. |
| 6,073,961 A | 6/2000 | Bailey et al. |
| 6,099,029 A | 8/2000 | Håland et al. |
| 6,199,898 B1 | 3/2001 | Masuda et al. |
| 6,203,058 B1 | 3/2001 | Elqadah et al. |
| 6,227,561 B1 | 5/2001 | Jost et al. |
| 6,231,073 B1 | 5/2001 | White, Jr. |
| 6,237,941 B1 | 5/2001 | Bailey et al. |

(Continued)

FOREIGN PATENT DOCUMENTS

DE    200 15 065 U1    2/2001

(Continued)

*Primary Examiner*—Paul N. Dickson
*Assistant Examiner*—Joselynn Y. Sliteris
(74) *Attorney, Agent, or Firm*—Brinks Hofer Gilson & Lione

(57) ABSTRACT

An inflatable curtain (2) having an upper attachment edge (6) provided with mounting elements (14) for mounting the inflatable curtain in a vehicle cabin for deployment beside an interior surface (38) of the vehicle cabin. A gas-flow passage (28) extends along the attachment edge, and communicates with cells (32) defined by seams (30) in an inflatable region (4) which has a lower edge (8). Mounting elements (14) are located between the seams (30) of a respective cell (32). The inflatable curtain is formed from an inboard layer of fabric and an outboard layer of fabric, and is rolled from the region of the lower edge (8) with the roll being adjacent the outboard layer and with part of the inboard layer forming the exterior of the roll.

17 Claims, 3 Drawing Sheets

U.S. PATENT DOCUMENTS

| | | |
|---|---|---|
| 6,273,456 B1 | 8/2001 | Heigl |
| 6,293,581 B1 * | 9/2001 | Saita et al. ............... 280/730.2 |
| 6,299,199 B1 | 10/2001 | Bowers et al. |
| 6,312,009 B1 | 11/2001 | Håland et al. |
| 6,336,654 B1 | 1/2002 | Stein et al. |
| 6,409,211 B1 | 6/2002 | Sheng et al. |
| 6,428,037 B1 | 8/2002 | Bakhsh et al. |
| 6,429,155 B1 * | 8/2002 | Li et al. ........................ 442/76 |
| 6,431,587 B1 | 8/2002 | O'Docherty |
| 6,457,740 B1 | 10/2002 | Vaidyaraman et al. |
| 6,464,250 B1 | 10/2002 | Faigle et al. |
| 6,494,480 B2 | 12/2002 | Håland et al. |
| 6,755,436 B2 * | 6/2004 | Hess et al. ............... 280/730.2 |
| 6,851,707 B2 * | 2/2005 | Bakhsh et al. ........... 280/730.2 |
| 2001/0019201 A1 | 9/2001 | Masuda et al. |
| 2001/0045729 A1 | 11/2001 | Mueller |
| 2002/0014762 A1 | 2/2002 | Bakhah et al. |
| 2002/0020991 A1 | 2/2002 | Tanase et al. |
| 2002/0036395 A1 | 3/2002 | Bakhsh et al. |
| 2002/0036396 A1 | 3/2002 | Fischer |
| 2002/0056974 A1 | 5/2002 | Webert |
| 2002/0105173 A1 | 8/2002 | Saderholm et al. |
| 2002/0125693 A1 | 9/2002 | Alsup et al. |
| 2002/0140211 A1 | 10/2002 | Takahara |
| 2002/0153713 A1 | 10/2002 | Fischer |
| 2002/0158450 A1 * | 10/2002 | Hoeft et al. ............... 280/730.2 |
| 2002/0158451 A1 * | 10/2002 | Nusshor ................... 280/730.2 |
| 2002/0163167 A1 | 11/2002 | Hill |
| 2002/0175502 A1 | 11/2002 | Tesch et al. |
| 2002/0195804 A1 | 12/2002 | Hess et al. |
| 2003/0205887 A1 * | 11/2003 | Wallner et al. ........... 280/730.2 |

FOREIGN PATENT DOCUMENTS

| | | |
|---|---|---|
| DE | 200 16 717 U1 | 3/2001 |
| EP | 1 228 930 | 8/2002 |
| EP | 1 238 865 A2 | 9/2002 |
| GB | 2 314 300 | 12/1997 |
| GB | 2 357 467 | 6/2001 |
| JP | 11-321536 | 11/1999 |
| JP | 2000-335356 | 12/2000 |
| WO | WO 99/42333 | 8/1999 |
| WO | WO 02/058970 | 8/2002 |
| WO | WO 04/000609 | 12/2003 |
| WO | WO 2004/007250 | 1/2004 |
| WO | 2004/026640 | 4/2004 |

* cited by examiner

AIR-BAG ARRANGEMENT AND A METHOD OF PREPARING AND MOUNTING AN AIR-BAG

CROSS REFERENCE TO RELATED APPLICATION

This application claims priority to PCT/SE2003/001693, filed Nov. 4, 2003 and GB 0226042.0, filed Nov. 7, 2002.

FIELD OF THE INVENTION

The present invention relates to an air-bag arrangement, and to a method of preparing and mounting an air-bag in a vehicle cabin.

BACKGROUND OF THE INVENTION

Various designs of "inflatable curtain" air-bags have been proposed for use in vehicles. Such inflatable curtains are air-bags which are initially stored within the roof lining of the vehicle immediately above the door openings, the air-bag inflating, in response to a signal from an appropriate sensor, to form a "curtain" lying adjacent a side window of the vehicle. Typically such an air-bag is provided with a generally rectangular inflatable region, the upper edge of which is provided with mounting lugs by means of which the air-bag may be mounted in position. The inflatable region may be divided into a plurality of separate inflatable cells, and an internal gas-flow passage is provided to direct gas from a gas generator to the cells that are to be inflated.

It is known in the art to roll up an inflatable curtain and provide it within a motor vehicle in an "inboard" manner, that is, with the roll mounted towards the vehicle cabin or compartment interior. Upon inflation of such an "inboard" rolled inflatable curtain, the unrolling inflatable curtain tends to move towards the interior of the motor vehicle, and may contact the head of an occupant if the occupant is in an "out of position" situation, for example, if the head of the occupant is placed against the side window of the motor vehicle.

The present invention seeks to provide an improved air-bag, and a method for preparing and mounting an air-bag in a vehicle.

According to this invention there is provided an air-bag arrangement having an inflatable curtain formed from at least two super-imposed layers of fabric material and having an attachment edge provided with a plurality of mounting elements for mounting the inflatable curtain in a vehicle cabin for deployment beside an interior surface of the vehicle cabin. One layer of the air-bag being an inboard layer, and the other layer being an outboard layer. The inflatable curtain air-bag also having a deployable edge spaced from the attachment edge, a gas-flow passage extending along the attachment edge, and between the attachment edge and the deployable edge an inflatable region which is divided into a plurality of cells by partitions extending substantially transversely relative to the axis of the gas-flow passage. The cells communicate with the gas-flow passage. Each mounting element being positioned intermediate an adjacent pair of partitions. The deployable edge of the inflatable curtain is movable from a stowed position to a deployed position by inflation of the inflatable region of the inflatable curtain, the inflatable curtain being at least partially rolled-up with its deployable edge within the roll, with the roll being adjacent part of the outboard layer with the inboard layer forming the exterior of the roll.

Conveniently the partitions are seams which may be formed by stitching.

Alternatively the air-bag is formed from woven fabric, and the seams are formed integrally with the air-bag.

As a further alternative the seams are formed by adhesion.

Preferably the mounting elements are each located substantially centrally of a respective adjacent pair of partitions.

Conveniently a portion of the outboard layer of the inflatable curtain extends from the attachment edge and then turns to join the roll.

Advantageously straps extend from spaced-apart points on the air-bag, each strap having a free end adapted to be secured to a respective anchoring point formed on the interior of the vehicle cabin.

Preferably the air-bag is enclosed in a sleeve or housing.

Conveniently parts of the air-bag extend through apertures formed in the sleeve or housing such that such parts protrude from the sleeve or housing.

Advantageously the air-bag is connected to a gas generator.

According to another aspect of this invention there is provided a method of preparing an air-bag for a vehicle cabin for deployment beside an interior surface of the vehicle cabin. The air-bag in the form of an inflatable curtain formed from at least two super-imposed layers and having an attachment edge provided with a plurality of mounting elements for mounting the inflatable curtain in a vehicle cabin for deployment adjacent to an interior surface of the vehicle cabin. One layer of the air-bag being an inboard layer, and the other layer of fabric being an outboard layer. The inflatable curtain also having a deployable edge spaced from the attachment edge, and a gas-flow passage extending along the attachment edge. Between the attachment edge and the deployable edge is an inflatable region which is divided into a plurality of cells by partitions extending substantially transversely relative to the axis of the gas-flow passage, the cells communicating with the gas-flow passage. Each mounting element of the inflatable curtain air-bag being positioned intermediate an adjacent pair of partitions, the deployable edge of the inflatable curtain being movable from a stowed position to a deployed position by inflation of the inflatable region of the inflatable curtain. The method of this invention includes the steps of rolling at least part of the inflatable curtain with its deployable edge within the roll, with the roll being adjacent part of the outboard layer and with the inboard layer forming the exterior of the roll.

Preferably the air-bag is folded such that a portion of the outboard layer of the inflatable curtain extends from the attachment edge and then turns to join the roll.

Advantageously the method further comprises the step of encasing the air-bag in a sleeve or housing.

Preferably the method further comprises the step of locating parts of the air-bag to extend through apertures formed in the sleeve or housing such that said parts protrude from the sleeve or housing.

Conveniently the method further comprises the step of connecting the air-bag to a gas generator.

BRIEF DESCRIPTION OF THE DRAWINGS

In order that the invention might be more readily understood, and so that further features thereof may be appreciated, embodiments of the invention will now be described, by way of example, with reference to the accompanying drawings in which:

FIG. 2A is a view corresponding to the cross-section 2A-2A shown in FIG. 2 when the air-bag of FIG. 2 is prepared according to the method of the present invention, FIG. 2B corresponds to FIG. 2A at an initial stage of inflation, FIG. 2C corresponds to FIG. 2A at a further stage of inflation, FIG. 4 shows an air-bag prepared according to a second embodiment of the method of the present invention.

DETAILED DESCRIPTION OF THE INVENTION

Figure 1:
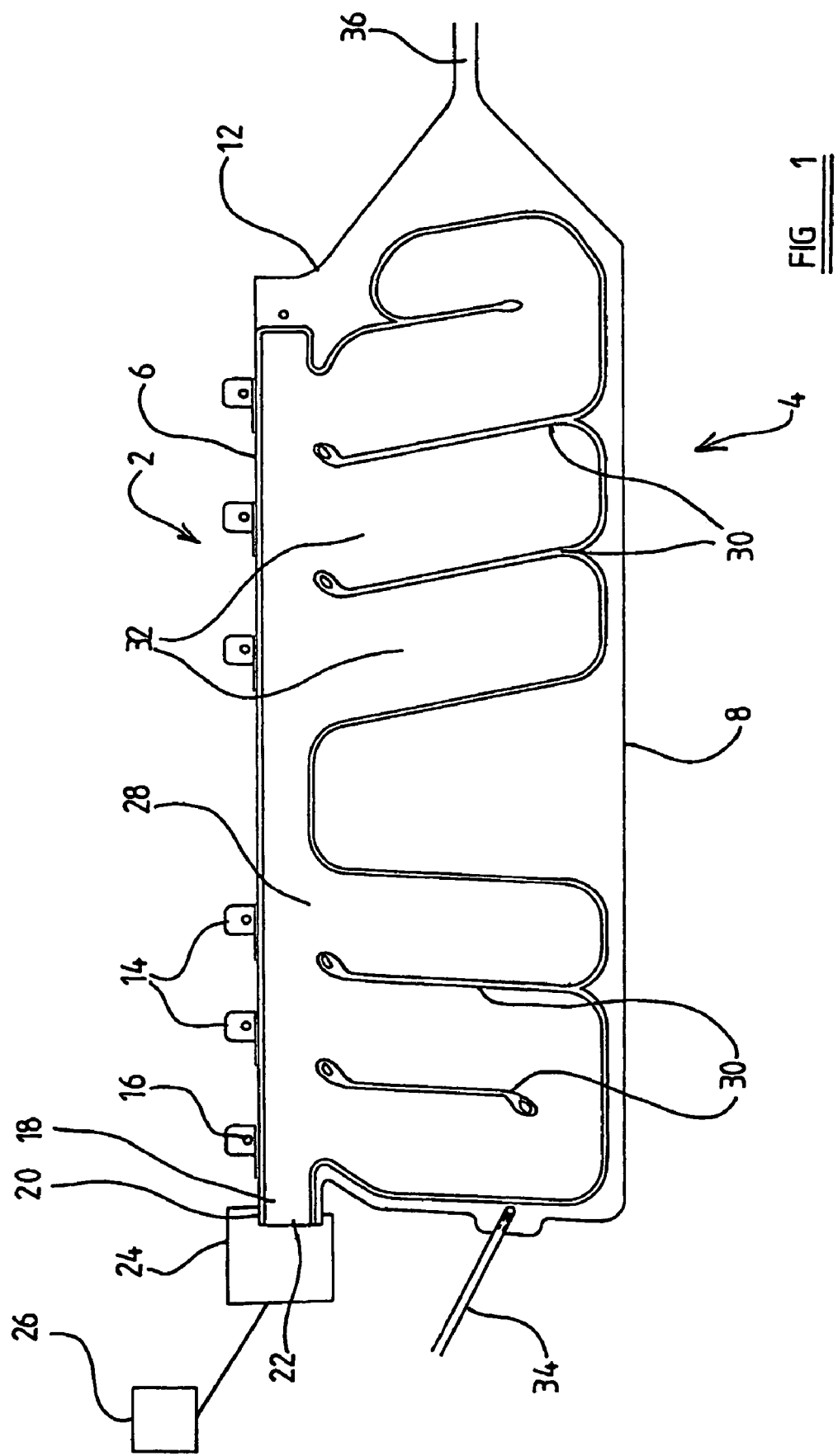
FIG. 1 is a diagrammatic side view of an air-bag according to a first embodiment of the invention in a condition prior to preparation.

Referring initially to FIG. 1, an air-bag 2 embodying the invention is illustrated in the form of an inflatable curtain. The air-bag 2 is formed from two superimposed layers of fabric, each layer of fabric having the same outer peripheral shape. The two layers of fabric may be secured together to form seams by stitching. Alternatively, the entire air-bag 2 may be constructed using a one piece weaving technique, familiar to those skilled in the art, in which the seams are integrally woven into the bag. The two layers could as a further alternative be secured together using adhesive to form the seams, or using any other suitable securing method known in the art. As will become clear, one layer of fabric is an inboard layer, and the other layer is an outboard layer.

The inflatable curtain air-bag 2 has a substantially rectangular main inflatable region 4, defined by four side edges: an upper edge 6, lower edge 8 and two opposed side edges 10 and 12. The upper and lower edges 6 and 8 are longer than the two opposed side edges 10 and 12 and the lower edge 8 extends substantially parallel to the upper edge 6.

The upper edge 6 constitutes an attachment edge which is provided with a plurality of mounting elements in the form of mounting tabs 14. Each of the mounting tabs 14 has a hole 16 formed therethrough to facilitate the mounting of the air-bag 2 in the cabin of a vehicle. The mounting tabs 14 are located on the upper edge 6 of the substantially rectangular main inflatable region 4 of the air-bag 2 at evenly spaced intervals.

A projecting portion 18 is formed at one end of the substantially rectangular main inflatable region 4, and extends from an upper corner of the region 4 in a direction parallel to the upper edge 6 of the air-bag and perpendicular to a side edge 10 of the air-bag. The projecting portion 18 is formed from the fabric used to form the main inflatable region 4 and thus the air-bag 2 is formed integrally.

The projecting portion 18 defines a substantially rectangular shaped gas inlet throat 20. One end 22 of the gas inlet throat 20, which is remote from the rectangular inflatable region 4 of the air-bag, is connected to a gas generator 24. This gas generator is connected to a collision and roll-over sensor 26. The other end of the gas inlet throat 20 communicates with a gas-flow passage 28 formed in the interior of the rectangular main inflatable region 4 of the air-bag. The gas-flow passage 28 is generally linear and runs along the top of the air-bag 2 adjacent to the upper edge 6. The gas-flow passage 28 defines a generally linear horizontal axis. An inner gas-flow duct of metal, plastic or fabric may be provided within the gas-flow passage 28 to protect the fabric of the air-bag from the effects of the aggressive flow of gas from the gas generator.

A plurality of partitions in the form of substantially vertically extending seams 30 define a plurality of substantially parallel inflatable cells 32. The seams 30 extend substantially transversely of the axis of the gas-flow passage 28, and each cell 32 has a substantially vertical axis which intersects the lower edge 8 of the rectangular region 4 of the air-bag. The top of each of the cells 32 communicates with the gas-flow passage 28. The inflatable cells 32 are, in the illustrated embodiment, in a row and are generally rectangular. When inflated, these cells 32 each adopt a substantially cylindrical cross-sectional shape profile.

The mounting tabs 14 are each positioned on the upper side edge 6 intermediate a pair of seams 30 defining a cell 32. Preferably each mounting tab 14 is located on the upper edge 6 substantially midway between the adjacent seams 30 defining a respective cell 32. Each cell 32 has a respective mounting tab 14 so that there is an equal number of cells 32 and tabs 14.

A pair of straps 34 and 36 extend from two spaced apart points, each point being on a respective side edge 10 and 12 of the air-bag 2. Each strap 34 and 36 has a free end which is adapted to be secured or mounted to a respective anchoring point formed on the interior of the cabin of a vehicle in which the air-bag 2 is to be mounted.

In the event that the vehicle in which the air-bag 2 is mounted is involved in a side-impact collision or a rollover, or in response to other pre-determined conditions, the sensor 26 generates a signal which is sent to the gas generator 24, causing the gas generator to generate and discharge gas. The gas flows through the gas inlet throat 20 and along the gas-flow passage 28 and hence into the cells 32, to inflate the cells. The air-bag 2 thus becomes inflated.

As the cells 32 inflate, they adopt a substantially cylindrical cross-sectional profile, resulting in the lower edge of the bag 8 decreasing in length. This reduction in length creates a line of tension between the anchoring points to which the straps 34 and 36 are secured which acts to hold the bag 2 in place beside the interior surface of the vehicle cabin. The substantially vertical axes of the cells 32 intersect this line of tension.

It has been found, surprisingly, that with the mounting tabs 14 located between adjacent seams 30, and above the cells 32, a good unrolling or deployment characteristic is achieved. It has been found that with mounting tabs 14 located in alignment with the seams separating the cells 32 the inflatable curtain can, during deployment, self-lock and not come down at all.

When the air-bag is inflated, one of the superimposed layers of fabric, the "inboard" layer, is on the side of the inflatable curtain 2 closest to the interior of the cabin, and the other layer of fabric, the "outboard" layer, is closest to the side of the vehicle.

Figure 2:
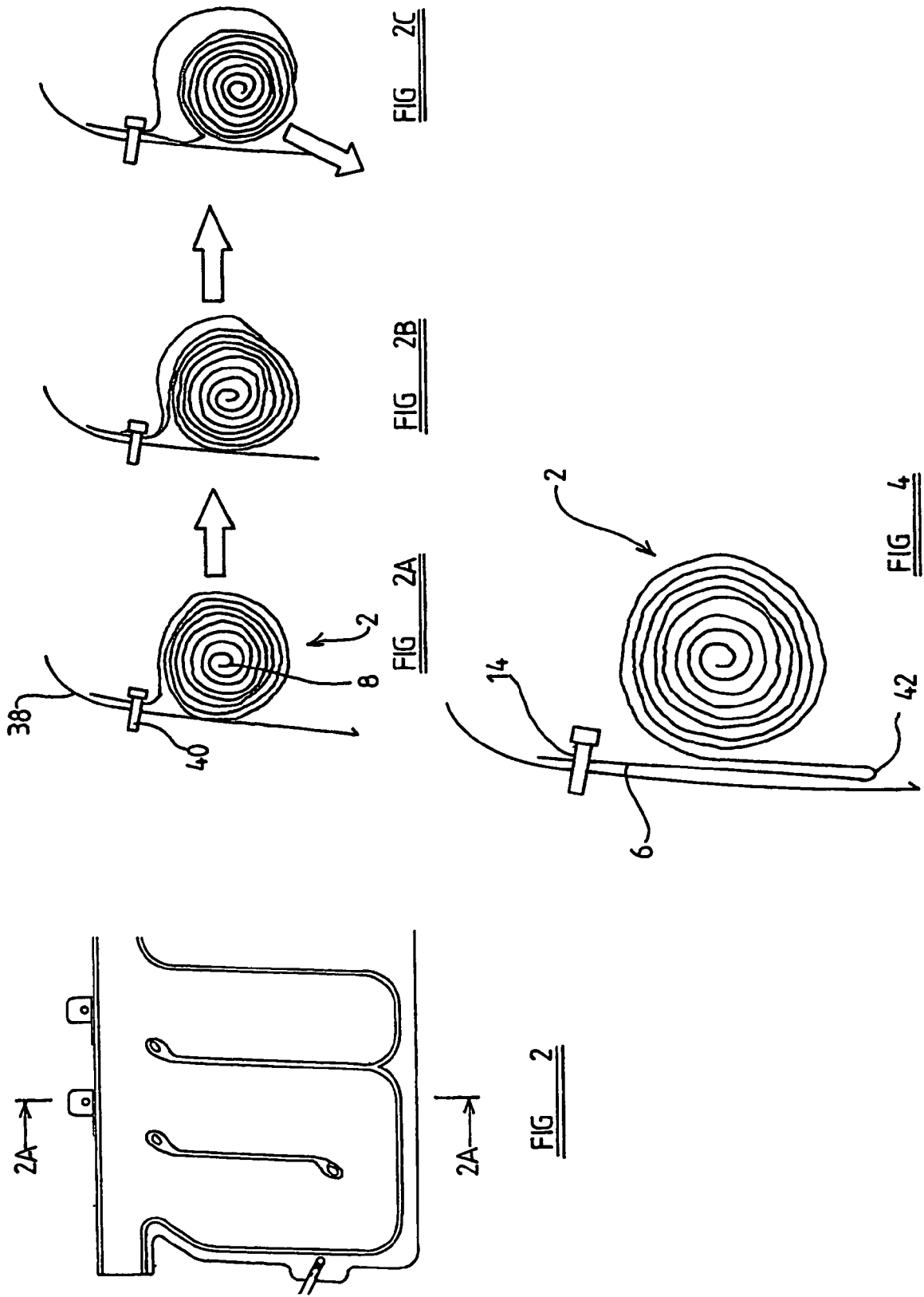
FIG. 2 is an enlarged detail of FIG. 1.

Referring now to FIG. 2A, an air-bag 2 prepared according to the method of the present invention is shown mounted to the interior wall or surface 38 of a vehicle cabin.

As shown in FIG. 2A, the air-bag of FIG. 1 has been rolled-up about the deployable lower edge 8. The lower edge 8 of the air-bag 2 thus lies in a stowed position at the middle of the roll along its central axis. The roll has been formed so that the roll is located adjacent the outboard layer of fabric, with the inboard layer of fabric forming the exterior of the roll.

Figure 3:
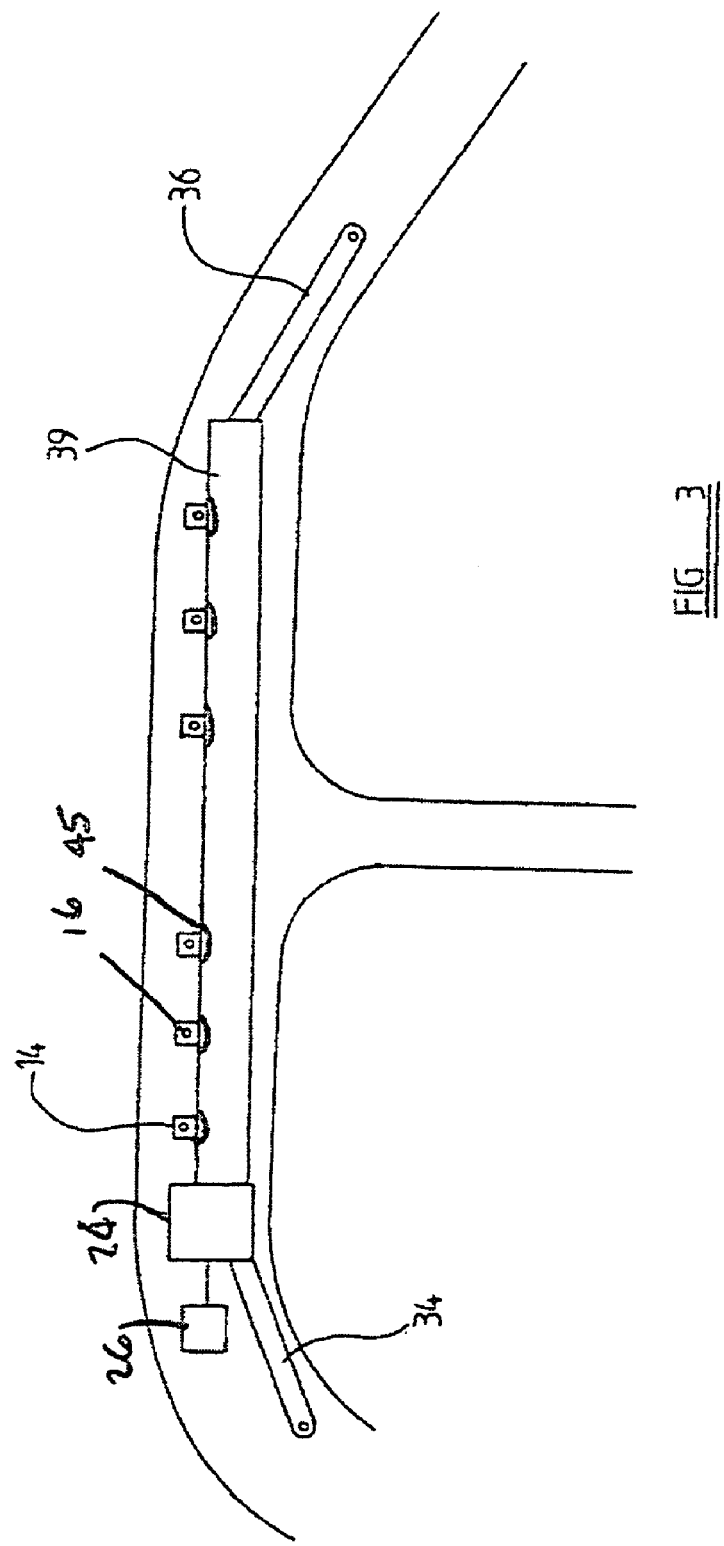
FIG. 3 is diagrammatic side-elevational view corresponding to the air-bag of FIG. 2A.

The rolled-up air-bag 2 has been encased within a sleeve or housing 39 as best seen in FIG. 3. The mounting tabs 14 extend through apertures 45 (schematically shown for illustrative purposes only) formed in the upper side edge of the sleeve or housing 39, such that the mounting tabs 14 protrude from the sleeve or housing 39 and the straps 34 and 36 extend through apertures formed in the ends of the sleeve or housing 39 such that the straps 34 and 36 protrude from the sleeve or housing 39. The air-bag 2 is connected to a gas generator 24 which is located within the roof lining of the vehicle. The gas generator is connected to a collision and roll-over sensor 26.

Returning to FIG. 2A, the air-bag 2 has been mounted to the vehicle with the roll of the air-bag adjacent the interior side wall or surface of the vehicle cabin. This means that the direction of wind of the roll mounted on a left-hand side of the vehicle is clockwise (travelling from the outside of the roll in towards its middle) and the roll mounted on a right-hand side of the vehicle is anti-clockwise (travelling from the outside of the roll towards its middle) as seen when looking down the axis of the roll from the vantage point of the back of the vehicle looking forwards.

The air-bag 2 is mounted adjacent an interior wall or surface 38 of the vehicle near the roof-line of the vehicle by means of fixings or fasteners 40 which pass the mounting tabs 14.

In the illustrated embodiment, the free end of a first strap 36 is attached to the "A" post, and the free end of a second strap 34 is attached to the "B" post, although the straps may be attached between any of the "A", "B", "C" or "D" posts of the vehicle, as appropriate. The air-bag 2 may be sized appropriately to cover the side wall or surface of the vehicle cabin between any two of the "A", "B", "C" or "D" posts as desired.

FIG. 2B shows the air-bag 2 in an initial stage of inflation. As can clearly be seen, gas has started to flow into the air-bag 2, and the inflatable region 4 of the air-bag has begun to fill. As a result, the air-bag 2 begins to deploy or unroll, and is prevented from rolling upwards by the secure fixing of the mounting tabs 14. The early stages of inflation of the air-bag have caused the air-bag to rupture and break through the sleeve or housing 39.

FIG. 2C shows the air-bag 1 in a later stage of inflation, in which the air-bag has inflated further and the curtain has begun to unroll. The air flowing into the air-bag 2 forces the curtain to unroll in a direction which has a component directed towards the interior wall or surface 38 of the vehicle, that is, away from the interior of the vehicle cabin and towards surface 38 and the exterior of the vehicle, as indicated by the arrow marked "A". The roll is effectively trapped between that part of the inflatable curtain that has inflated and the side surface 38 of the vehicle.

It is to be appreciated that the air-bag will further unroll until it is fully deployed. The lower edge 8 hence defines a deployable edge which moves from a stowed position in the middle of the roll to a deployed position at the lower edge of the inflated air-bag. If the head of the occupant is in an out of position situation, that is, with the head of the occupant displaced towards or placed against the side window, the unrolling outboard roll would try to move downwards into the space between the head of the occupant and the window, thus forcing the head of the occupant back into the cabin and helping to reduce the risk of the head of the occupant from moving out of the cabin, for example through a broken window.

As mentioned earlier, when the cells 32 are inflated, they adopt a substantially cylindrical profile, resulting in the lower edge of the bag decreasing in length. This reduction in length creates a line of tension between the anchoring points to which the straps 36 and 38 are secured which acts to hold the air-bag 2 in place. The substantially vertical axes of the cells 32 intersect this line of tension.

FIG. 4 shows an alternative embodiment of an air-bag according to the present invention mounted in a vehicle, in which only part of the air-bag 2 is rolled up. The roll is a roll that does not commence at the lower edge of the inflatable curtain, but instead starts at a point on the inboard layer of fabric above the lower edge 8. Thus there is more of the outboard layer of fabric remaining above the roll than there is of the inboard layer of fabric. The roll is located on the inboard side of the rest of the inflatable curtain, but the part of the inflatable curtain between the roll and the upper side edge 6 hangs down and is folded up about a lower-most fold-line 42 located beneath the roll. Again the roll lies adjacent part of the outboard fabric layer with the inboard fabric layer forming the exterior of the completed roll. This air-bag is also encased in a sleeve or housing 39 and is similarly connected to a gas-generator 24 and sensor 26 arrangement (not shown).

It is to be appreciated that this air-bag 2 will have a similar inflation characteristic to that illustrated in FIGS. 2A-2C, the difference being that the region of the air-bag depending downwardly from the fixing tab 14 to the fold 42 will inflate first, moving the entire roll downwardly before the roll of the air-bag 2 unrolls. This may tend to cause the roll to move inwardly towards the compartment of the vehicle, but this movement may be prevented by strategically located elements of trim.

Whilst the invention has been described with reference to preferred embodiments, it is to be appreciated that many different embodiments may be devised without departing from the scope of the invention. For example, the number of inflatable cells and the configuration of the inflatable cells may be changed substantially according to the specific design of the motor vehicle in which the inflatable curtain is to be mounted. Alternatively, the main inflatable region may simply be undivided, that is, it may simply be a single inflatable region which is not divided into separate inflatable cells as in the illustrated embodiments.

As a further alternative, the air-bag could be positioned to unroll over or in front of a different wall or surface of the vehicle cabin, e.g. it could be positioned to unroll in front of the windscreen or rear window.

While the above description constitutes the preferred embodiment of the present invention, it will be appreciated that the invention is susceptible to modification, variation and change without departing from the proper scope and fair meaning of the accompanying claims.

The invention claimed is:

1. An inflatable curtain for a vehicle comprising the inflatable curtain formed from at least two super-imposed layers of fabric and having an upper attachment edge provided with a plurality of mounting elements for mounting the inflatable curtain in the interior of the vehicle for deployment adjacent an interior surface of the vehicle cabin, with one of the fabric layers being an inboard layer, and the other of the fabric layers being an outboard layer, the inflatable curtain also having a lower edge spaced from the upper attachment edge, a gas-flow passage extending along the upper attachment edge, an inflatable region formed between the upper attachment edge and the lower edge which is divided into a plurality of cells by a plurality of partitions extending substantially transversely relative to the axis of the gas-flow passage, the cells communicating with the gas-flow passage, each of the mounting elements being positioned substantially centrally of a corresponding adjacent pair of the partitions such that no portion of each of the mounting elements is aligned with either of the partitions of the corresponding adjacent pair of the partitions, the lower edge of the inflatable curtain being movable from a stowed position in which the curtain is in an uninflated condition to a deployed position when the curtain is in an inflated condition by inflation of the inflatable region of the inflatable curtain, the inflatable curtain being at least partially rolled-up in the stowed position to form a roll with the lower edge within the roll and with the inboard layer of fabric forming the exterior of the roll.

2. An air-bag arrangement according to claim 1 wherein the partitions are seams.

3. An air-bag arrangement according to claim 2 wherein the seams are formed by stitching through the inboard layer and the outboard layer.

4. An air-bag arrangement according to claim 2 wherein the seams are integrally woven into the air-bag.

5. An air-bag arrangement according to claim 2 wherein the seams are formed by adhesion.

6. An air-bag arrangement according to claim 1 wherein a portion of the outboard layer of the inflatable curtain extends from the upper attachment edge and then turns to join the roll.

7. An air-bag arrangement according to claim 1 wherein straps extend from spaced-apart points on the air-bag, each of the straps having a free end adapted to be secured to a respective anchoring point formed on the interior of the vehicle cabin.

8. An air-bag according to claim 1 wherein the air-bag is enclosed in a sleeve.

9. An air-bag according to claim 8 wherein parts of the air-bag extend through apertures formed in the sleeve such that the parts protrude from the sleeve.

10. An air-bag according to claim 1 wherein the air-bag is connected to a gas generator.

11. An air-bag arrangement according to claim 1 wherein each of the pair of adjacent partitions has one of the mounting elements positioned substantially centrally therebetween.

12. A method of preparing an air-bag for a vehicle cabin for deployment beside an interior surface of the vehicle cabin, comprising the steps of providing the air-bag having an inflatable curtain formed from at least two super-imposed layers and having an upper attachment edge provided with a plurality of mounting elements for mounting the inflatable curtain in the vehicle cabin for deployment beside an interior surface of the vehicle cabin, with one of the layers being an inboard layer, and the other of the layers being an outboard layer, the inflatable curtain also having a lower edge spaced from the upper attachment edge, a gas-flow passage extending along the upper attachment edge, and between the upper attachment edge and the lower edge an inflatable region which is divided into a plurality of cells by a plurality of partitions extending substantially transversely relative to the axis of the gas-flow passage, the cells communicating with the gas-flow passage, each of the mounting elements being positioned substantially centrally of a corresponding adjacent pair of the partitions such that no portion of each of the mounting elements is aligned with either of the partitions of the corresponding adjacent pair of the partitions, the lower edge of the inflatable curtain being movable from a stowed position to a deployed position by inflation of the inflatable region of the inflatable curtain, the method further comprising the steps of rolling at least part of the inflatable curtain with the lower edge within the roll and with the inboard layer forming the exterior of the roll.

13. A method according to claim 12 wherein the air-bag is folded such that a portion of the outboard layer of the inflatable curtain extends from the upper attachment edge and then turns to join the roll.

14. A method according to claim 12, the method further comprising the step of encasing the air-bag in a sleeve.

15. A method according to claim 14 further comprising the step of locating parts of the air-bag to extend through apertures formed in the sleeve such that the parts protrude from the sleeve.

16. A method according to claim 12 further comprising the step of connecting the air-bag to a gas generator.

17. A method according to claim 12 wherein each of the pair of adjacent partitions has one of the mounting elements positioned substantially centrally therebetween.

* * * * *